US012776505B2

(12) United States Patent
Cho

(10) Patent No.: US 12,776,505 B2
(45) Date of Patent: Oct. 27, 2026

(54) METHOD AND APPARATUS FOR MANUFACTURING MEMBRANE-ELECTRODE ASSEMBLY

(71) Applicant: KOLON INDUSTRIES, INC., Seoul (KR)

(72) Inventor: Dong Jun Cho, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 822 days.

(21) Appl. No.: 17/637,842

(22) PCT Filed: Oct. 30, 2020

(86) PCT No.: PCT/KR2020/015030
§ 371 (c)(1),
(2) Date: Feb. 24, 2022

(87) PCT Pub. No.: WO2021/091169
PCT Pub. Date: May 14, 2021

(65) Prior Publication Data
US 2022/0278345 A1 Sep. 1, 2022

(30) Foreign Application Priority Data
Nov. 6, 2019 (KR) ........................ 10-2019-0141003

(51) Int. Cl.
*H01M 8/1004* (2016.01)
*H01M 8/0273* (2016.01)
(Continued)

(52) U.S. Cl.
CPC ....... *H01M 8/1004* (2013.01); *H01M 8/0273* (2013.01); *H01M 8/0286* (2013.01); *H01M 2008/1095* (2013.01)

(58) Field of Classification Search
CPC ............. H01M 8/1004; H01M 8/0273; H01M 8/0286; H01M 2008/1095; Y02E 60/50; Y02E 70/50
See application file for complete search history.

(56) References Cited

U.S. PATENT DOCUMENTS

2004/0173072 A1* 9/2004 Ishii .................... H01M 8/1004 83/100
2009/0023035 A1* 1/2009 Sasaoka .............. H01M 8/0267 29/623.2
(Continued)

FOREIGN PATENT DOCUMENTS

CN 1993851 A 7/2007
CN 108232256 A 6/2018
(Continued)

OTHER PUBLICATIONS

Park et al. (KR20160056028A and using Machine Translation as English version) (Year: 2016).*
(Continued)

*Primary Examiner* — Wyatt P Mcconnell
*Assistant Examiner* — Joshua P Mcclure
(74) *Attorney, Agent, or Firm* — Harvest IP Law, LLP

(57) ABSTRACT

According to a method and an apparatus for manufacturing a membrane-electrode assembly of the present invention, positioning holes are formed through a multi-layered lamination of an electrolyte membrane, electrodes, and sub-gasket films, in an area which is not included in a final product, and manifold holes of the membrane-electrode assembly are then quickly and accurately formed on the basis of the positioning holes. Therefore, the present invention can increase the productivity while lowering the defect rate of the membrane-electrode assembly.

9 Claims, 3 Drawing Sheets

(51) Int. Cl.

| | |
|---|---|
| ***H01M 8/0286*** | (2016.01) |
| *H01M 8/10* | (2016.01) |

(56) References Cited

U.S. PATENT DOCUMENTS

| | | | | |
|---|---|---|---|---|
| 2011/0159407 A1* | 6/2011 | Chen | H01M 8/00 | 429/514 |
| 2015/0093679 A1* | 4/2015 | Ikoma | H01M 8/0267 | 429/480 |
| 2017/0129141 A1* | 5/2017 | Masaka | B29C 33/14 | |
| 2018/0257312 A1* | 9/2018 | Fukushima | B26F 1/02 | |
| 2019/0039112 A1* | 2/2019 | Hirata | B21D 28/265 | |
| 2023/0197985 A1* | 6/2023 | Ko | H01M 8/04097 | 429/457 |

FOREIGN PATENT DOCUMENTS

| | | | |
|---|---|---|---|
| CN | 110311152 | A | 10/2019 |
| JP | H09289028 | A | 11/1997 |
| JP | 2013196849 | A | 9/2013 |
| JP | 2018133342 | A | 8/2018 |
| JP | 6427215 | B2 | 11/2018 |
| KR | 100819783 | B1 | 4/2008 |
| KR | 20160056028 | A | 5/2016 |
| KR | 101659067 | B1 | 9/2016 |
| KR | 20170040443 | A | 4/2017 |
| WO | 2018061831 | A1 | 4/2018 |

OTHER PUBLICATIONS

Huang et al. (CN110311152A as cited in IDS and using Machine Translation as English version) (Year: 2019).*

The office action dated Aug. 17, 2023 related to the corresponding Chinese Patent application.

The Search report dated Jul. 12, 2024 related to the corresponding European Patent application.

The office action dated Feb. 13, 2023 related to the corresponding Japanese Patent application.

* cited by examiner

Prior Art

METHOD AND APPARATUS FOR MANUFACTURING MEMBRANE-ELECTRODE ASSEMBLY

CROSS REFERENCE TO RELATED APPLICATIONS

This application is a National Stage of International Application No. PCT/KR2020/015030filed Oct. 30, 2020, claiming priority to Korean Patent Application No. 10-2019-0141003 filed Nov. 6, 2019, the disclosures of which is incorporated herein by reference in its entirety.

TECHNICAL FIELD

The present disclosure relates to a method and apparatus for manufacturing a membrane-electrode assembly, and more particularly to a method and apparatus for manufacturing a membrane-electrode assembly capable of rapidly and accurately forming a manifold hole configured to transfer gas or a coolant, thereby improving productivity while reducing a defect rate.

BACKGROUND ART

A polymer electrolyte membrane fuel cell (PEMFC), which is configured to generate electricity using a structure in which unit cells, each of which includes a membrane-electrode assembly (MEA) and a separator (also referred to as a bipolar plate), are stacked, has attracted attention as a next-generation energy source capable of replacing fossil fuels due to high energy efficiency and environmentally friendly characteristics thereof.

The membrane-electrode assembly generally includes an anode (also referred to as a fuel electrode), a cathode (also referred to as an air electrode), and a polymer electrolyte membrane therebetween.

When fuel such as hydrogen gas is supplied to the anode, hydrogen ions ($H^+$) and electrons ($e^-$) are generated at the anode as the result of hydrogen oxidation reaction. The generated hydrogen ions are transferred to the cathode via the polymer electrolyte membrane, and the generated electrons are transferred to the cathode via an external circuit. Oxygen supplied to the cathode is bonded with the hydrogen ions and the electrons, and water is generated as the result of reduction.

In general, a first sub-gasket film having an electrode window configured to expose the anode and a second sub-gasket film having an electrode window configured to expose the cathode are provided respectively at a first surface of the polymer electrolyte membrane and a second surface of the polymer electrolyte membrane, which is opposite the first surface.

The first and second sub-gasket films are components configured to (i) prevent damage to an edge portion of the polymer electrolyte membrane due to repeated expansion and contraction of the polymer electrolyte membrane during operation of the fuel cell, (ii) improve handling of the polymer electrolyte membrane, which is extremely thin, and/or the membrane-electrode assembly, and (iii) prevent leakage of hydrogen gas and oxygen gas.

Manifold holes configured to transfer hydrogen/oxygen gas or a coolant must be provided in the membrane-electrode assembly. Hereinafter, a conventional manifold hole forming method will be described in detail with reference to FIG. 1.

First, first and second sub-gasket films 14 and 15 are attached respectively to opposite surfaces of a catalyst coated membrane (CCM) obtained by forming a first electrode (e.g. an anode) 12 and a second electrode (e.g. a cathode) 13 on first and second surfaces of an electrolyte membrane 11, respectively.

A central portion of the first electrode 12 is exposed through a first electrode window 14*a* formed in the first sub-gasket film 14, and a central portion of the second electrode 13 is exposed through a second electrode window 15*a* formed in the second sub-gasket film 15. The exposed portions of the first and second electrodes 12 and 13 are active areas AA that directly contribute to generation of electricity. That is, the first and second electrode windows 14*a* and 15*a* define the active areas AA.

A multilayer laminate thus obtained is cut along a first cutting line CL1 corresponding to the shape and size of a final membrane-electrode assembly. In addition, the multilayer laminate is cut along a second cutting line CL2 corresponding to the shape and size of a manifold hole to be provided in the final membrane-electrode assembly to form the manifold hole.

Conventionally, the position of the first or second electrode 12 or 13 is measured using a vision sensor, and the positions of the first and second cutting lines CL1 and CL2 are determined based thereon. Sensing points SP for measuring the position of the first or second electrode 12 or 13 are at least two corners of the first electrode 12 and/or the second electrode 13. In an overlap type structure, in which an edge portion of an electrode is covered with a sub-gasket, unlike an edge-fit type structure, in which the entirety of an electrode is exposed through an electrode window, the corners of the first and second electrodes 12 and 13 are covered with the first and second sub-gasket films 14 and 15, respectively. Since the sub-gasket films are generally colorless and transparent, however, the corners may still be sensed by the vision sensor, and therefore the corners may function as sensing points SP.

As illustrated in FIG. 1, however, when the first and second sub-gasket films 14 and 15 are attached to the CCM, the situation in which the first and second electrode windows 14*a* and 15*a* are not accurately aligned with the first and second electrodes 12 and 13 unintentionally occasionally occurs.

If the first and second cutting lines CL1 and CL2 are determined based on the positions of the corners of the electrodes 12 and 13 in spite of such mismatch between the electrode windows 14*a* and 15*a* and the electrodes 12 and 13, the active areas AA defined by the electrode windows 14*a* and 15*a* are not located in the center of a final product, and there occurs a difference in distances d1 and d2 between the active areas AA and the manifold holes, whereby product defects are caused.

Also, in the overlap type structure, positioning of the first and second cutting lines CL1 and CL2 using the vision sensor is performed on the premise that the first and second sub-gasket films 14 and 15 are colorless and transparent. If the first and second sub-gasket films 14 and 15 are colored or opaque, therefore, sensing the position of the first or second electrode 12 or 13 is impossible or accuracy thereof is greatly reduced.

In addition, a series of processes of sensing the position of the first or second electrode 12 or 13 using the vision sensor, determining the positions of the first and second cutting lines CL1 and CL2 based on the result thereof, and cutting the multilayer laminate are performed only for each individual multilayer laminate, and therefore there is a limitation in improving productivity of the membrane-electrode assembly.

DISCLOSURE

Technical Problem

Therefore, the present disclosure relates to a method and apparatus for manufacturing a membrane-electrode assembly capable of preventing problems caused by limitations and shortcomings of the related art described above.

It is an object of the present disclosure to provide a membrane-electrode assembly manufacturing method capable of rapidly and accurately forming a manifold hole configured to transfer gas or a coolant, thereby improving productivity while reducing a defect rate.

It is another object of the present disclosure to provide a membrane-electrode assembly manufacturing apparatus capable of rapidly and accurately forming a manifold hole configured to transfer gas or a coolant, thereby improving productivity while reducing a defect rate.

In addition to the above objects, other features and advantages of the present disclosure will be described hereinafter, or will be clearly understood by those skilled in the art to which the present disclosure pertains from the following description thereof.

Technical Solution

In accordance with an aspect of the present disclosure, there is provided a membrane-electrode assembly manufacturing method including a first step of preparing a membrane-electrode laminate including an electrolyte membrane having a first surface and a second surface opposite the first surface, a first electrode on the first surface, and a second electrode on the second surface, a second step of preparing a first sub-gasket film having a first central region and a first peripheral region surrounding the first central region, a third step of forming a first electrode window in the first central region, a fourth step of forming at least two first positioning holes in the first peripheral region, a fifth step of preparing a second sub-gasket film having a second central region and a second peripheral region surrounding the second central region, a sixth step of forming a second electrode window in the second central region, a seventh step of forming at least two second positioning holes in the second peripheral region, an eighth step of attaching the first sub-gasket film to the first surface of the electrolyte membrane such that at least a portion of the first electrode is exposed through the first electrode window and attaching the second sub-gasket film to the second surface of the electrolyte membrane such that at least a portion of the second electrode is exposed through the second electrode window, whereby forming a multilayer laminate, a ninth step of forming at least one manifold hole in a central portion of the multilayer laminate corresponding to the first and second central regions, and a tenth step of removing a peripheral portion of the multilayer laminate corresponding to the first and second peripheral regions.

The ninth step of forming the at least one manifold hole and the tenth step of removing the peripheral portion of the multilayer laminate may be performed based on positions of the first and second positioning holes.

The ninth step of forming the at least one manifold hole and the tenth step of removing the peripheral portion of the multilayer laminate may be performed by press-punching the multilayer laminate.

The method may further include a step of securing the multilayer laminate before the ninth step of forming the at least one manifold hole and the tenth step of removing the peripheral portion of the multilayer laminate.

The step of securing the multilayer laminate may be performed by inserting positioning pins into the first and second positioning holes.

The first to eighth steps may be repeated to obtain the multilayer laminate in plural, the multilayer laminates may be secured together by inserting the positioning pins into the first and second positioning holes of the multilayer laminates, and the ninth step and the tenth step may be performed by press-punching the multilayer laminates together.

The step of securing the multilayer laminates together may include a step of stacking the multilayer laminates on a supporting plate and a step of mounting the supporting plate having the multilayer laminates stacked thereon on a die having the positioning pins while inserting the positioning pins into the first and second positioning holes of the multilayer laminates.

The step of securing the multilayer laminates together may further include moving the positioning pins along guide rails formed on the die to adjust positions of the positioning pins according to sizes of the multilayer laminates before mounting the supporting plate on the die.

The third step of forming the first electrode window and the fourth step of forming the first positioning holes may be simultaneously performed, and the sixth step of forming the second electrode window and the seventh step of forming the second positioning holes may also be simultaneously performed.

In accordance with another aspect of the present disclosure, there is provided a membrane-electrode assembly manufacturing apparatus including a supporting plate configured to allow at least one multilayer laminate to be placed thereon, the multilayer laminate including an electrolyte membrane, a first electrode on a first surface of the electrolyte membrane, a first sub-gasket film disposed on the first surface of the electrolyte membrane, the first sub-gasket film having a first electrode window configured to expose at least a portion of the first electrode, a second electrode on a second surface of the electrolyte membrane, and a second sub-gasket film disposed on the second surface of the electrolyte membrane, the second sub-gasket film having a second electrode window configured to expose at least a portion of the second electrode, a die having the supporting plate mounted thereon or configured to allow the supporting plate to be mounted thereon, and a punching plate, wherein the multilayer laminate has at least two positioning holes formed in a peripheral portion thereof, the die includes at least two positioning pins configured to be inserted into the positioning holes, and the punching plate includes a punch configured to remove the peripheral portion having the positioning holes formed therein from the multilayer laminate and to form at least one manifold hole in a residual portion of the multilayer laminate.

The die may have guide rails configured to guide movement of the positioning pins.

The general description of the present disclosure given above is provided merely to illustrate or describe the present disclosure, and does not limit the scope of rights of the present disclosure.

Advantageous Effects

According to the present disclosure, positioning holes are formed in a region of a multilayer laminate of an electrolyte membrane, electrodes, and sub-gasket films that is not included in a final product, and manifold holes of a membrane-electrode assembly are rapidly and accurately formed based thereon, whereby it is possible to improve productivity while reducing a defect rate of the membrane-electrode assembly

DESCRIPTION OF DRAWINGS

The accompanying drawings, which are included to assist in understanding of the present disclosure and are incorporated in and constitute a part of the present specification, illustrate embodiments of the present disclosure and serve to explain the principle of the present disclosure together with the detailed description of the present disclosure.

BEST MODE

Hereinafter, a method and apparatus for manufacturing a membrane-electrode assembly according to an embodiment of the present disclosure will be described in more detail with reference to FIGS. 2 and 3.

Figure 1:
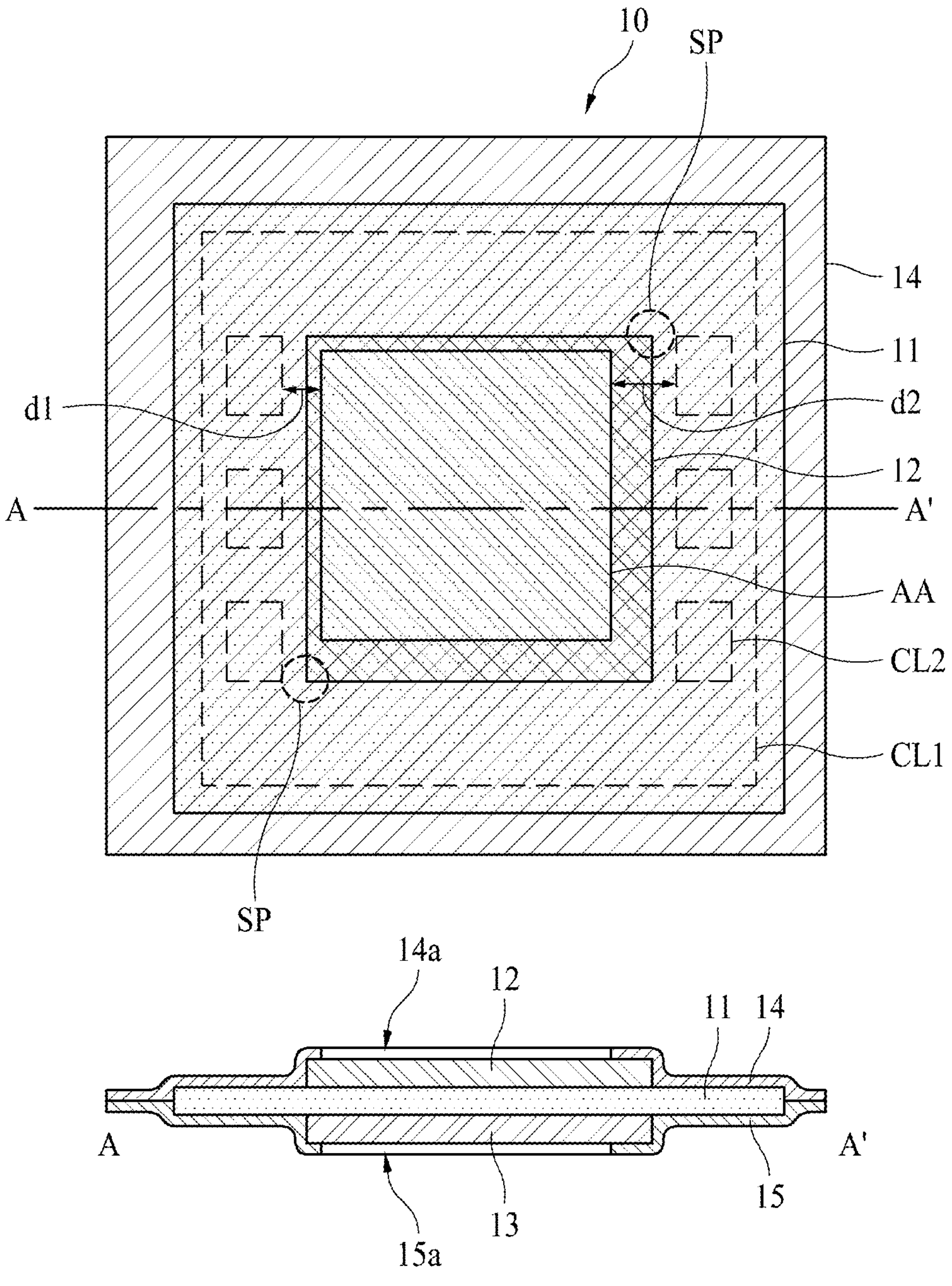
FIG. 1 schematically illustrates a conventional membrane-electrode assembly manufacturing method.
Figure 2:
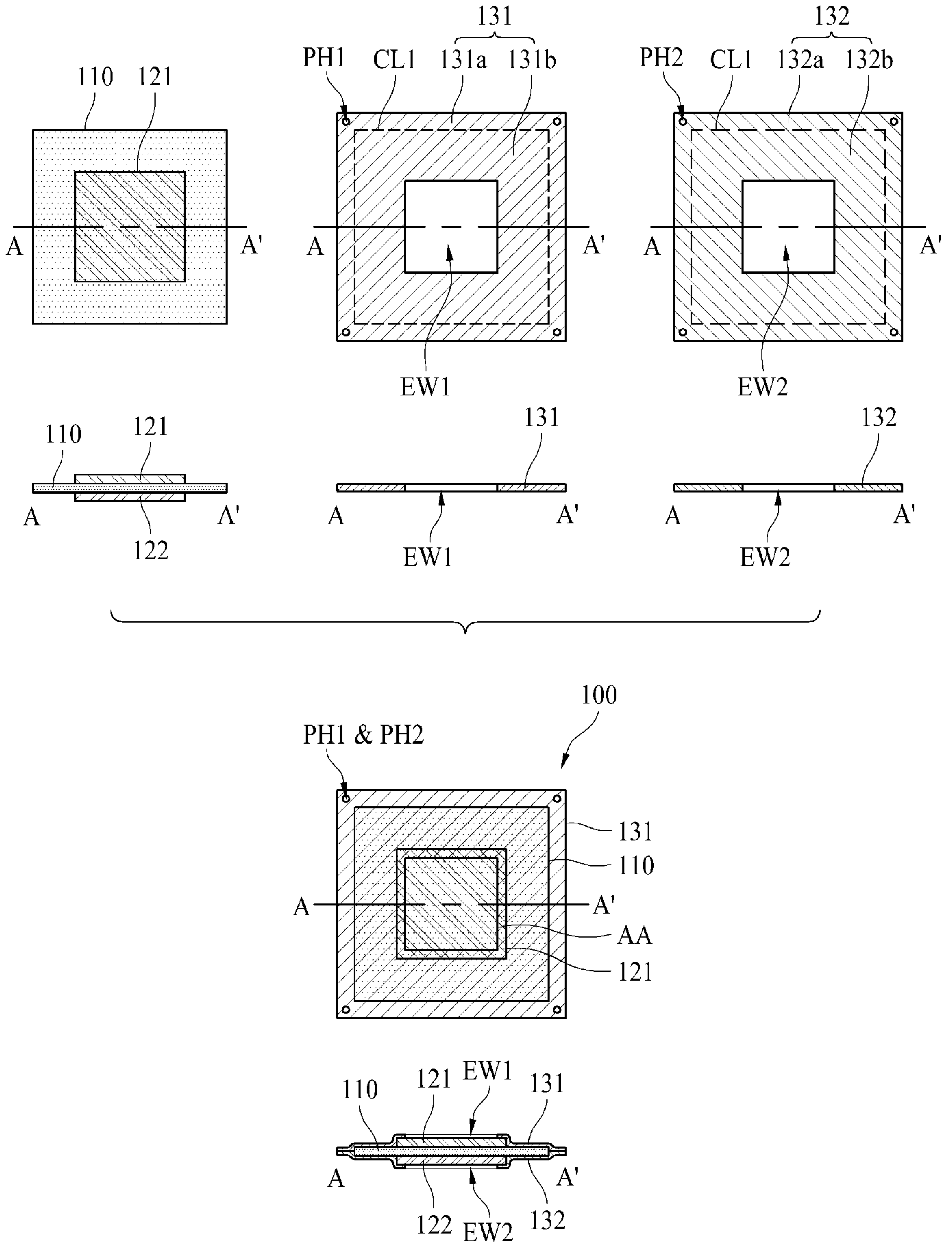
FIGS. 2 and 3 schematically illustrate a method and apparatus for manufacturing a membrane-electrode assembly according to an embodiment of the present disclosure.

As illustrated in FIG. 2, a membrane-electrode laminate, a first sub-gasket film 131, and a second sub-gasket film 132 are prepared.

The membrane-electrode laminate includes an electrolyte membrane 110, a first electrode 121, and a second electrode 122. The electrolyte membrane 110 has a first surface and a second surface, which is opposite the first surface. The first electrode 121 is disposed on the first surface, and the second electrode 122 is disposed on the second surface.

In this specification, the term "electrolyte membrane" is a concept that encompasses both a single membrane type polymer electrolyte membrane (PEM) and a reinforced membrane type composite PEM.

The first sub-gasket film 131 has a first central region 131*b* and a first peripheral region 131*a*, which surrounds the first central region 131*b*. Similarly, the second sub-gasket film 132 has a second central region 132*b* and a second peripheral region 132*a*, which surrounds the second central region 132*b*.

Each of the first and second central regions 131*b* and 132*b* is a region that is located inside a first cutting line CL1, which is a simple closed curve corresponding to the shape and size of a final membrane-electrode assembly product, and that will remain in the final product. In contrast, each of the first and second peripheral regions 131*a* and 132*a* is a region that is located outside the first cutting line CL1 and that will be removed through a cutting/punching process performed along the first cutting line CL1 and thus will not exist in the final product.

Subsequently, as illustrated in FIG. 2, a first electrode window EW1 and at least two first positioning holes PH1 are formed in the first sub-gasket film 131. The first electrode window EW1 is formed in the first central region 131*b* of the first sub-gasket film 131. In contrast, the first positioning holes PH1 are formed in the first peripheral region 131*a* of the first sub-gasket film 131.

Similarly, a second electrode window EW2 and at least two second positioning holes PH2 are formed in the second sub-gasket film 132. The second electrode window EW2 is formed in the second central region 132*b* of the second sub-gasket film 132. In contrast, the second positioning holes PH2 are formed in the second peripheral region 132*a* of the second sub-gasket film 132.

The first electrode window EW1 and the first positioning holes PH1 may be simultaneously formed. Alternatively, one of the first electrode window EW1 and the first positioning holes PH1 may be formed, and then the other may be formed.

Similarly, the second electrode window EW2 and the second positioning holes PH2 may also be simultaneously or sequentially formed. When the second electrode window EW2 and the second positioning holes PH2 are sequentially formed, the order is not particularly restricted.

In an embodiment of the present disclosure, the first electrode window EW1 and the first positioning holes PH1 may be formed at once using a punching tool, and the second electrode window EW2 and the second positioning holes PH2 may also be formed at once using a punching tool. Consequently, at least a portion of each of the first and second electrodes 12 and 13 is exposed, whereby relative positions between the first and second electrode windows EW1 and EW2, which define active areas AA that directly contribute to generation of electricity, and the first and second positioning holes PHI and PH2 may be maintained uniform.

Subsequently, as illustrated in FIG. 2, the first and second sub-gasket films 131 and 132 are attached respectively to the first and second surfaces of the electrolyte membrane 110 to form a multilayer laminate 100.

The first and second sub-gasket films 131 and 132 may be simultaneously or sequentially attached to the electrolyte membrane 110. When the first and second sub-gasket films 131 and 132 are sequentially attached to the electrolyte membrane 110, the order is not particularly restricted.

When the first sub-gasket film 131 is attached to the first surface of the electrolyte membrane 110, at least a portion of the first electrode 121 is exposed through the first electrode window EW1. That is, in an edge-fit type structure, the entirety of the first electrode 121 is exposed through the first electrode window EW1. In contrast, in an overlap type structure, an edge portion of the first electrode 121 is covered with the first sub-gasket film 131, and therefore only a central portion of the first electrode 121 is exposed through the first electrode window EW1. Similarly, when the second sub-gasket film 132 is attached to the second surface of the electrolyte membrane 110, at least a portion of the second electrode 122 is exposed through the second electrode window EW2.

The size or shape of the electrolyte membrane 110 is not particularly restricted as long as, when the multilayer laminate 100 is formed, the electrolyte membrane does not block the first and second positioning holes PHI and PH2 of the first and second sub-gasket films 131 and 132. For example, as illustrated in FIG. 3, in the multilayer laminate 100, the electrolyte membrane 110 may have a size and shape such that the periphery of the electrolyte membrane is disposed outside the simple closed curve of the first cutting line CL1 while the electrolyte membrane does not block the first and second positioning holes PH1 and PH2.

Alternatively, the electrolyte membrane 110 may have a size and shape such that the periphery of the electrolyte membrane is disposed inside the simple closed curve of the first cutting line CL1, whereby the electrolyte membrane may overlap only the first and second central regions 131*b* and 132*b* of the first and second sub-gasket films 131 and 132. Particularly, in order to minimize the usage amount of the electrolyte membrane 110, which is relatively expensive, the electrolyte membrane 110 may have a size and shape such that the electrolyte membrane does not overlap even a second cutting line CL2 for manifold hole MH formation.

Subsequently, a cutting process is performed along the second cutting line CL2 to form at least one manifold hole MH in a central portion of the multilayer laminate 100 corresponding to the first and second central regions 131*b* and 132*b*. In addition, a cutting process is performed along the first cutting line CL1 to remove a peripheral portion of the multilayer laminate 100 corresponding to the first and second peripheral regions 131*a* and 132*a*.

In an embodiment of the present disclosure, a process of forming the at least one manifold hole MH and a process of removing the peripheral portion of the multilayer laminate 100 may be performed based on the positions of the first and second positioning holes PH1 and PH2. That is, the second cutting line CL for forming the at least one manifold hole MH and the first cutting line CL1 for removing the peripheral portion of the multilayer laminate 100 may be determined based on the positions of the first and second positioning holes PHI and PH2.

Figure 3:
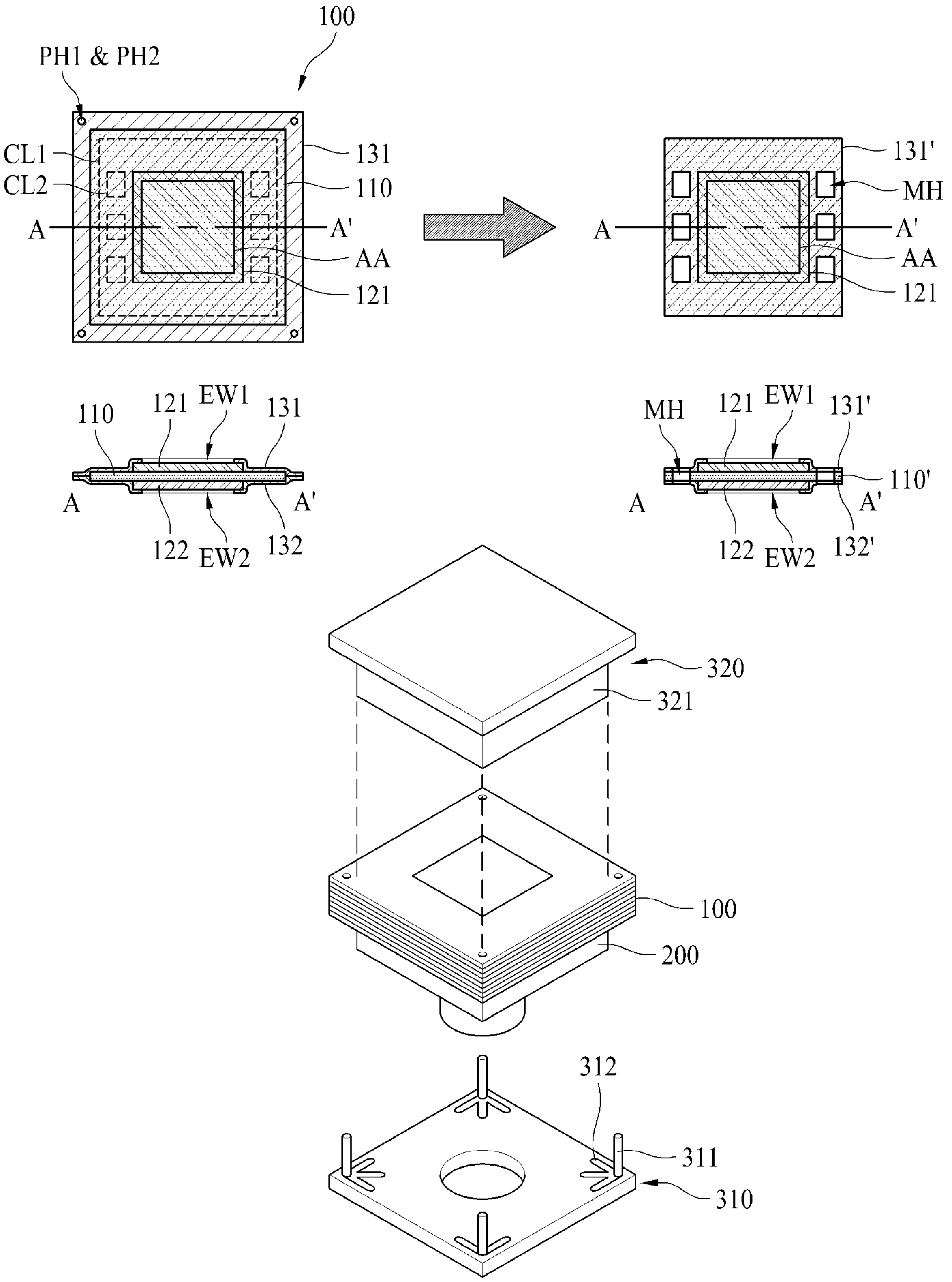

For example, as shown in FIG. 3, the multilayer laminate 100 may be secured by inserting positioning pins 311 into the first and second positioning holes PHI and PH2 of the multilayer laminate 100, and then the cutting processes may be performed along the first and second cutting lines CL1 and CL2. That is, the cutting processes of the multilayer laminate 100 may be performed on the basis of the positioning pins 311 (therefore, based on the positions of the first and second positioning holes PHI and PH2).

Alternatively, the positions of the first and second positioning holes PHI and PH2 are measured using a vision sensor, and the positions of the first and second cutting lines CL1 and CL2 may be determined based thereon.

According to the present disclosure, the cutting processes may be performed based on the positions of the first and second positioning holes PHI and PH2, which have uniform positions relative to the first and second electrode windows EW1 and EW2 that define the active areas AA, whereby the first and second electrode windows EW1 and EW2 (i.e. the active areas AA) may always be disposed in the center of a final membrane-electrode assembly product, and the distance between the active areas AA and the manifold hole MH may be maintained uniform, and therefore it is possible to remarkably reduce a defect rate of the membrane-electrode assembly and a fuel cell including the same.

The process of cutting the multilayer laminate 100 along the second cutting line CL2 in order to form the at least one manifold hole MH and the process of cutting the multilayer laminate 100 along the first cutting line CL1 in order to remove the peripheral portion of the multilayer laminate 100 may be simultaneously or sequentially performed. When the cutting processes are sequentially performed, the order is not particularly restricted.

In an embodiment of the present disclosure, the cutting processes along the first and second cutting lines CL1 and CL2 may be performed by press-punching.

Also, in an embodiment of the present disclosure, a plurality of multilayer laminates 100 each having first and second positioning holes PH1 and PH2 may be formed using the above-described method, and the multilayer laminates 100 may be press-punched using the membrane-electrode assembly manufacturing apparatus according to the present disclosure, whereby it is possible to reduce a defect rate of the membrane-electrode assembly and to maximize productivity, which will be described below in detail.

As illustrated in FIG. 3, the apparatus according to the present disclosure includes a supporting plate 200, a die 310, and a punching plate 320.

First, a plurality of multilayer laminates 100 formed using the above-described method is stacked on the supporting plate 200. The supporting plate 200 may have a shape corresponding to the multilayer laminate 100 and/or a final membrane-electrode assembly product. For example, the supporting plate 200 may be smaller than the multilayer laminates 100 to such an extent that first and second positioning holes PH1 and PH2 of the multilayer laminates 100 do not overlap the supporting plate 200.

The supporting plate 200 may be mounted on the die 310 including at least two positioning pins 311, and when the plurality of multilayer laminates 100 is sequentially stacked on the supporting plate 200, the positioning pins 311 of the die 310 are inserted into the first and second positioning holes PH1 and PH2 of the multilayer laminates 100 in order to secure the positions of the multilayer laminates 100 relative to the die 310.

Alternatively, the die 310, which includes at least two positioning pins 311, may be configured to allow the supporting plate 200, on which the multilayer laminates 100 are placed, to be mounted thereon. That is, the plurality of multilayer laminates 100 may be stacked on the supporting plate 200, and then the supporting plate 200 may be mounted on the die 310. When the supporting plate 200 is mounted on the die 310, the positioning pins 311 of the die 311 are inserted into the first and second positioning holes PHI and PH2 of the multilayer laminates 100 stacked on the supporting plate 200, whereby the positions of the multilayer laminates 100 relative to the die 310 may be secured.

Optionally, the die 310 may have guide rails 312 configured to guide the movement of the positioning pins 311. The positions of the positioning pins 311 may be adjusted through electronic control or manually. In an embodiment of the present invention, therefore, the positions of the positioning pins 311 may be adjusted according to the sizes of the multilayer laminates 100 (or according to the positions of the first and second positioning holes PHI and PH2) before the multilayer laminates 100 are stacked on the support plate 200 secured to the die 310 or before the support plate 200, on which the multilayer laminates 100 are stacked, is mounted on the die 310.

The punching plate 320 includes a punch 321 configured to remove a peripheral portion of each of the multilayer laminates 100, in which the first and second positioning holes PHI and PH2 are formed, through punching along the first cutting line CL1 and to form at least one manifold hole MH in a residual portion of each of the multilayer laminates 100 through punching along the second cutting line CL2.

At least one of the punching plate 320 having the punch 321 and the die 310 may be moved in order to perform press-punching.

According to the present disclosure, as described above, the plurality of multilayer laminates 100 on the supporting plate 200 is press-punched together, whereby it is possible to remarkably improve productivity of the membrane-electrode assembly.

Although the plurality of multilayer laminates 100 is press-punched together in the above description, the apparatus according to the present disclosure may also be used when only one multilayer laminate 100 is press-punched.

The invention claimed is:

1. A membrane-electrode assembly manufacturing method comprising:

a first step of preparing a membrane-electrode laminate comprising an electrolyte membrane having a first surface and a second surface opposite the first surface, a first electrode on the first surface, and a second electrode on the second surface;

a second step of preparing a first sub-gasket film having a first central region and a first peripheral region surrounding the first central region;

a third step of forming a first electrode window in the first central region;

a fourth step of forming at least two first positioning holes in the first peripheral region;

a fifth step of preparing a second sub-gasket film having a second central region and a second peripheral region surrounding the second central region;

a sixth step of forming a second electrode window in the second central region;

a seventh step of forming at least two second positioning holes in the second peripheral region;

an eighth step of attaching the first sub-gasket film having the first electrode window and the at least two first positioning holes to the first surface of the electrolyte membrane such that at least a portion of the first electrode is exposed through the first electrode window and attaching the second sub-gasket film having the second electrode window and the at least two second positioning holes to the second surface of the electrolyte membrane such that at least a portion of the second electrode is exposed through the second electrode window, thereby forming a multilayer laminate in which the at least two first positioning holes of the first sub-gasket film and the at least two second positioning holes of the second sub-gasket film are located outside an outer periphery of the electrolyte membrane;

a ninth step of forming at least one manifold hole in a central portion of the multilayer laminate corresponding to the first and second central regions; and a tenth step of removing a peripheral portion of the multilayer laminate corresponding to the first and second peripheral regions, wherein the tenth step of removing the peripheral portion of the multilayer laminate is performed by cutting the multilayer laminate along a first cutting line, wherein the ninth step of forming the at least one manifold hole is performed by cutting the multilayer laminate along a second cutting line, and wherein the first and second cutting lines are determined based on positions of the first and second positioning holes, none of the first and second positioning holes being on either the first cutting line or the second cutting line.

2. The membrane-electrode assembly manufacturing method according to claim 1, wherein the ninth step of forming the at least one manifold hole and the tenth step of removing the peripheral portion of the multilayer laminate are simultaneously performed.

3. The membrane-electrode assembly manufacturing method according to claim 2, wherein the ninth step of forming the at least one manifold hole and the tenth step of removing the peripheral portion of the multilayer laminate are performed by press-punching the multilayer laminate.

4. The membrane-electrode assembly manufacturing method according to claim 1, further comprising a step of securing the multilayer laminate before the ninth step of forming the at least one manifold hole and the tenth step of removing the peripheral portion of the multilayer laminate.

5. The membrane-electrode assembly manufacturing method according to claim 4, wherein the step of securing the multilayer laminate is performed by inserting positioning pins into the first and second positioning holes.

6. The membrane-electrode assembly manufacturing method according to claim 5, wherein the first to eighth steps are repeated to obtain the multilayer laminate in plural, the multilayer laminates are secured together by inserting the positioning pins into the first and second positioning holes of the multilayer laminates, and the ninth step and the tenth step are performed by press-punching the multilayer laminates together.

7. The membrane-electrode assembly manufacturing method according to claim 6, wherein the step of securing the multilayer laminates together comprises:

a step of stacking the multilayer laminates on a supporting plate; and a step of mounting the supporting plate having the multilayer laminates stacked thereon on a die having the positioning pins while inserting the positioning pins into the first and second positioning holes of the multilayer laminates.

8. The membrane-electrode assembly manufacturing method according to claim 7, wherein the step of securing the multilayer laminates together further comprises moving the positioning pins along guide rails formed on the die to adjust positions of the positioning pins according to sizes of the multilayer laminates before mounting the supporting plate on the die.

9. The membrane-electrode assembly manufacturing method according to claim 1, wherein the third step of forming the first electrode window and the fourth step of forming the first positioning holes are simultaneously performed, and the sixth step of forming the second electrode window and the seventh step of forming the second positioning holes are simultaneously performed.

* * * * *